(12) United States Patent
Sakamoto

(10) Patent No.: US 7,793,942 B2
(45) Date of Patent: Sep. 14, 2010

(54) METAL GASKET

(75) Inventor: Masanori Sakamoto, Utsunomiya (JP)

(73) Assignee: Ishikawa Gasket Co., Ltd., Minato-ku, Tokyo (JP)

( * ) Notice: Subject to any disclaimer, the term of this patent is extended or adjusted under 35 U.S.C. 154(b) by 84 days.

(21) Appl. No.: 11/259,250

(22) Filed: Oct. 27, 2005

(65) Prior Publication Data

US 2006/0103077 A1 May 18, 2006

(30) Foreign Application Priority Data

Nov. 16, 2004 (JP) ............................. 2004-331404

(51) Int. Cl.
*F02F 11/00* (2006.01)

(52) U.S. Cl. ...................... 277/593; 277/595

(58) Field of Classification Search .......... 277/593–595
See application file for complete search history.

(56) References Cited

U.S. PATENT DOCUMENTS

| 4,387,904 A | * | 6/1983 | Nicholson | .................... 277/595 |
| 4,714,260 A | * | 12/1987 | Udagawa | .................... 277/595 |
| 4,867,462 A | * | 9/1989 | Udagawa | .................... 277/595 |
| 4,896,891 A | * | 1/1990 | Udagawa | .................... 277/593 |
| 5,009,438 A | * | 4/1991 | Udagawa | .................... 277/595 |
| 5,230,521 A | * | 7/1993 | Ueta | ........................... 277/595 |
| 5,232,229 A | * | 8/1993 | Udagawa | .................... 277/595 |
| 5,451,063 A | * | 9/1995 | Udagawa et al. | ............ 277/595 |
| 5,544,899 A | * | 8/1996 | Ueta | ........................... 277/595 |
| 6,056,295 A | * | 5/2000 | Udagawa | .................... 277/595 |
| 6,161,842 A | * | 12/2000 | Miyaoh | ...................... 277/653 |
| 6,322,084 B1 | * | 11/2001 | Yamada et al. | .............. 277/591 |
| 7,014,194 B2 | * | 3/2006 | Udagawa et al. | ............ 277/594 |
| 7,213,813 B2 | * | 5/2007 | Sueda | ......................... 277/594 |

\* cited by examiner

*Primary Examiner*—Alison K Pickard
(74) *Attorney, Agent, or Firm*—Manabu Kanesaka

(57) ABSTRACT

A metal gasket includes a first metal plate having a main full bead with bottom portions around a hole to be sealed, and a second metal plate laminated with the first metal plate on a depression side of the main full bead. The second metal plate has restricting members for restricting expansion of the bottom portions of the main full bead. Thus, when the gasket is compressed, lateral expansion of the main full bead is restricted to provide an appropriate surface pressure by the main full bead.

12 Claims, 3 Drawing Sheets

METAL GASKET

BACKGROUND OF THE INVENTION AND RELATED ART STATEMENT

The present invention relates to a metal gasket such as a cylinder head gasket to be installed between two engine members, such as a cylinder head and a cylinder block of an internal-combustion engine, to seal therebetween.

When joint surfaces of the cylinder head and the cylinder block (cylinder body) of an automobile engine are sealed, a metal cylinder head gasket is installed between the cylinder head and cylinder block, so that combustion gas, coolant water, or lubricating oil can be sealed.

Due to demands for a lighter engine, manufacturing cost reduction, and so on, the cylinder head gasket has being shifted to a gasket with a simple structure formed by one or two metal substrates or plates from a laminated type wherein a number of metal substrates are laminated. Accordingly, since the substrates are formed by one or two plates, and also usable materials are limited due to the lighter engine, the type and quantity of sealing means are also limited, so that there is no choice but to use a relatively simplified sealing means.

On the other hand, even if the cylinder head gasket seals between the engine members, there is a large difference in the sealing performance required according to type of sealing-target holes. Accordingly, in a cylinder bore, it is necessary to seal high-heat and high-pressure combustion gas in a cylinder. On the other hand, in a liquid hole for circulating coolant water or engine oil, it is necessary to seal relatively low-heat and low-pressure liquid.

Also, due to an engine structure, there is a difference of the surface pressure around the cylinder bore surrounded by bolt holes for tightening bolts; and the liquid hole located outside the bolt hole in many cases, wherein a pressure bonding force by the tightening bolt acts in only one side.

Especially, high surface pressure is required around the cylinder bore. However, the engine members made from a relatively soft aluminum alloy are required not to be damaged, so that it is difficult to use a metal substrate with high stiffness. As a result, there is a problem that the shape and arrangement of a conventional bead cannot provide enough stiffness.

In the above-mentioned cylinder head gasket, when a bead is simply provided, the stiffness and sealing performance of the bead depend on the shape of the bead and the material characteristic or thickness of the metal substrate. Accordingly, this reduces the possibility of design, and leads to the difficulty in having an appropriate sealing performance respectively relative to each sealing-target hole.

Specifically, in order to improve the stiffness of the bead, the plate thickness, plate material, and the bead structure such as the curvature and height of the bead are required to be changed. However, in an actual gasket design, overall optimization is required so that changes of the plate thickness and material are not easy. In the above-mentioned condition, a gasket capable of locally improving the stiffness or following-up of the bead is required.

Therefore, as shown in FIG. 8, a gasket 2 was proposed mainly as the cylinder head gasket (e.g. refer to the Patent Document 1). In the gasket 2, a main bead 6A and sub-beads 6B linearly connecting to the bottom portions of the main bead 6A are formed in a metal substrate 2, and the surface pressure is generated intensively on the top portions of the main bead 6A and the sub-beads 6B, so that the gasket 2 can be reliably sealed with large surface pressure.

However, due to frictional force generated on the top portions of the sub-bead 6B, the bottom portions of the main bead 6A are prevented from enlarging to some expansion, and improve the stiffness of the main bead 6A, so that relatively large sealing surface pressure can be obtained. However, there is a limitation to stop the expansion of the top portions of the sub-beads 6B only by the frictional force, so that it is not enough to obtain large stiffness.

Also, as shown in FIG. 9, as a metal gasket constituted by two structures, the following metal gasket is proposed. Although the sealing subjects are holes for an engine intake-exhaust system, cross-sectional shapes of circular beads 4 elastically surrounding the holes 2 project in the opposite directions, respectively, from flat parts of metal substrates 1. Also, two plates are formed to have waves with two mountain-shaped portions 4a, 4b which are continuing each other, and are laminated such that both tops of the mountain-shaped portions 4a of the circular beads 4 abut each other. One metal plate provides a circular bead 4 with a crushed amount of two heights of the mountain-shaped portions, and allows the circular bead 4 to adequately elastically deform. As a result, the metal gasket prevents leakage of the medium which should be sealed more effectively (for example, refer to the Patent Document 2). Incidentally, reference number 3 in FIG. 9 indicates a bolt hole.

However, in the gasket with the two structures wherein the wavelike and mountain-shaped top portions 4a abut against each other, when the abutting beads 4 slip, compressive stiffness of the beads 4 does not reach predetermined compressive stiffness, so that an intended effect cannot be obtained. As a result, the abutting beads 4 are required to be positioned with a high degree of accuracy. Since the positioning requires an advanced technique, it is difficult in a practical point for the cylinder head gasket with a structure including a minute bead whose width is 3 mm and below.

Patent Reference 1: Japanese Patent Publication No. H11-230355 (FIG. 2, page 2)

Patent Reference 2: Japanese Patent Publication No. 2002-54502 (FIG. 2, page 3)

The present invention was made in order to solve the above-mentioned problems, and an object of the invention is to provide a metal gasket for a cylinder head gasket and so on, constituted by multiple plates, wherein a first metal substrate includes a main full bead in the sealing hole, and a second metal substrate to be laminated on a depression side of the main full bead includes binding beads which bind the expansion of bottom portions at a portion where the bottom portions of the main full bead abut. The deformation of a widening direction of the bottom portions of the main full bead is bound or limited by the binding beads of the second metal substrate so that appropriate bead stiffness can be obtained. Accordingly, the metal gasket can distribute and maintain an appropriate surface pressure around the cylinder bore, and obtain an excellent sealing performance.

Further objects and advantages of the invention will be apparent from the following description of the invention.

SUMMARY OF THE INVENTION

In order to obtain the above-mentioned objects, a metal gasket of the present invention comprises multiple metal substrates or plates. The first metal substrate of the gasket provides a main full bead around a sealing-target hole. Also, in the second metal substrate laminated on a depression side of the main full bead, binding or restricting beads which bind the expansion of bottom portions are provided in parts where the bottom portions of the main full bead abut.

According to the structure, due to the binding beads which bind the expansion of the bottom portions of the main full bead, the deformation in a widening direction of the main full bead can be prevented so that the stiffness and sealing surface pressure of the main full bead can be remarkably enhanced. Accordingly, the structure can provide appropriate bead stiffness, and distribute and maintain an appropriate surface pressure around a cylinder bore and so on.

In the metal gasket, in the second metal substrate, the binding beads are formed by an inside full bead and outside full bead where the parts abutting against the bottom portions of the main full bead become depressions. In this case, when the gasket is compressed, the bottom portions of the main full bead are fitted into the depressions of the inside bead and outside bead respectively. As a result, the widening of the main full bead can be prevented.

Also, in the metal gasket, the binding beads of the second metal substrate are formed by a sub-full bead which is wider than the main full bead and provided in such a way that the parts where the bottom portions of the main full bead abut become both sides of the slopes of the depression. In this case, when the gasket is compressed, the bottom portions of the main full bead abut against the slopes of the depression of the wide sub-full bead, so that the widening of the main full bead can be prevented. In addition, from a different point of view, the wide full bead can be considered as a combination of two half beads.

Also, in the metal gasket, in the second metal substrate, the binding beads are arranged at an interval wider than the width of the main full bead, and formed by the inside full bead where the part abutting against the inside bottom portion of the main full bead is the outside slope of a projection; and the outside full bead where the part abutting against the outside bottom portion of the main full bead is the inside slope of the projection. In this case, when the gasket is pressed, the bottom portions of the main full bead abut against the slopes of the projections of the inside bead and outside bead respectively. As a result, the widening of the main full bead can be prevented.

Also, in the metal gasket, instead of using the binding beads, in the second metal substrate, in case that the parts abutting against the bottom portions of the main full bead are formed by binding depressions made by coining, when the gasket is compressed, the bottom portions of the main full bead are fitted into the binding depressions respectively. As a result, the widening of the main full bead can be prevented.

In addition, the bottom portions of the main full bead may be fitted into the slopes of the depressions, or the bottom portions of the main full bead may abut against the slopes of the projection of the bead in a state where the metal gasket is compressed. This includes the case wherein the fitting or abutting is not carried out before the metal gasket is pressed with a predetermined pressure, i.e. when the metal gasket is not compressed, it remains in an initiate shape. For example, in the cylinder head gasket, even if the bottom portions of the main full bead do not abut against the slopes of the projection of the bead in an initiate state of a single body of the gasket, the abutting may be carried out in a state wherein the gasket is installed between a cylinder head and a cylinder block and compressed by tightening bolts with the predetermined pressure, or wherein a large pressing force is generated in the gasket during an engine operation.

According to the structure, by binding or restricting the deformation of the main full bead, the stiffness of the main bead can be diversified and finely adjusted. Also, a binding degree in a widening direction of the main full bead can be adjusted by the shapes of the binding bead or binding depressions, and the material characteristic or thickness of the second metal substrate. Accordingly, by the combination of the shape of the main full bead and so on, various sealing surface pressures can be generated. As a result, a further appropriate sealing line can be formed relative to each sealing hole, and the sealing performance can be improved.

By forming the binding bead in a circumferential direction in a discontinuous manner, the strength of the binding force can be easily adjusted locally relative to the circumferential direction of the main full bead.

Alternatively, in order to obtain the above-mentioned objects, the metal gasket comprises metal substrates or plates, and is provided with a bead plate including a main full bead around a sealing hole. Also, in a second metal substrate laminated on a depression side of the main full bead, a binding bead which binds the expansion of the end portions of the bead plate is provided. The binding bead is formed with a full bead which is wider than the bead plate, and is provided in such a way that the parts abutting against the end portions of the bead plate are both sides of the slopes of the depression.

According to the structure, due to the binding bead which binds the expansion of the end portions of the bead plate including the main full bead, the deformation in a widening direction of the main full bead can be prevented, so that the stiffness and sealing surface pressure of the main full bead can be remarkably enhanced. Accordingly, the structure can provide appropriate bead stiffness, and distribute and maintain the appropriate surface pressure around the cylinder bore and so on.

As explained above, according to the metal gasket of the invention, in a laminated gasket sealing bead portion, by binding or limiting the expansion in a width direction of the bottom portions of the full bead formed in the first metal substrate, the stiffness of the bead can be improved.

The binding degree in a widening direction of the main full bead can be adjusted by the shapes of the binding bead or binding depressions, and the material characteristic or thickness of the second metal substrate. Accordingly, by the combination of the above and the shape of the main bead, the material characteristic or thickness of the first metal substrate and so on, various surface pressure can be generated.

Therefore, the metal gasket of the invention can obtain the appropriate bead stiffness relative to each sealing hole, and finely respond to each required sealing performance. As a result, since the metal gasket can distribute and maintain the appropriate surface pressure around the cylinder bore and so on, an excellent sealing performance can be obtained.

DETAILED DESCRIPTION OF PREFERRED EMBODIMENTS

Hereinafter, embodiments of a metal gasket of the present invention will be explained with reference to the drawings as examples of a cylinder head gasket. In addition, FIGS. 1~7 are explanatory drawings, and sealing portions are exaggeratingly shown by different thicknesses, different sizes, and horizontal to vertical ratios of a bead and coating film from actual ones in the cylinder head gaskets 1A~1F, so that the structures are easier to understand. Also, the word "inside" used in this specification indicates a cylinder bore side, and "outside" indicates a direction of receding from the cylinder bore.

The metal gaskets 1A~1F according to the embodiments of the present invention shown in FIGS. 1~7 are cylinder head gaskets to be installed between a cylinder head and the cylinder block (cylinder body) of engine, to seal high-temperature and high-pressure combustion gas of cylinder bores, and fluid such as coolant water or oil and so on in coolant-water channels or coolant-oil channels and so on.

The cylinder head gaskets 1A~1F include a first metal substrate or plate 10 made from a stainless-annealing material (anneal material) (for example, SUS304) and so on; and a second metal substrate or plate 20 formed by a stainless-thermal refining material (spring-steel plate) (for example, SUS301), or mild steel plate, and so on. The metal substrates 10, 20 are made to fit in shapes of the engine members such as the cylinder block and so on. In the metal substrates 10, 20, cylinder bores 2, liquid holes for circulating the coolant water or engine oil, and bolt holes for tightening bolts are formed.

Figure 1:
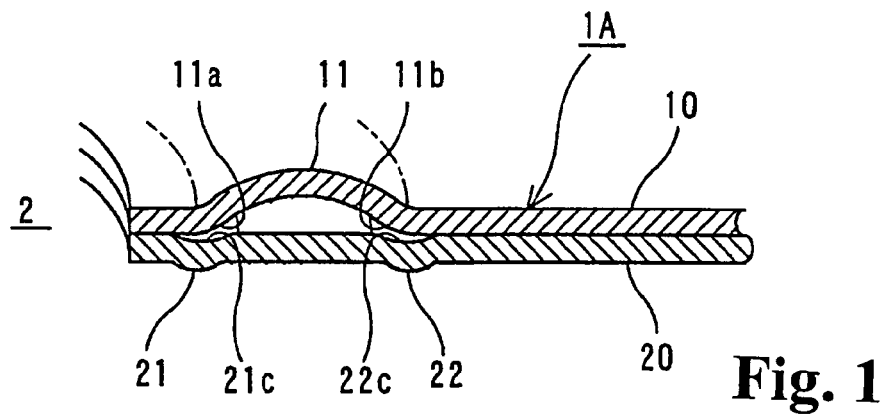
FIG. 1 is a fragmentary perspective view including a cross section showing a cylinder head gasket according to the first embodiment of the present invention.
Figure 2:
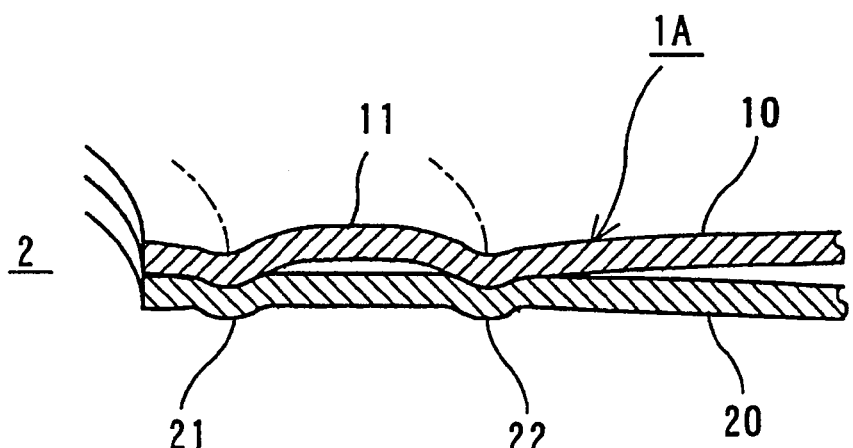
FIG. 2 is a fragmentary perspective view including a cross section showing a compressed state of the cylinder head gasket in FIG. 1.

As shown in FIGS. 1 and 2, in the metal gasket 1A according to the first embodiment, the first metal substrate 10 includes a main full bead 11 provided around the cylinder bore 2 which is a sealing hole. Also, in the second metal substrate 20 laminated on a depression side of the main full bead 11, the parts abutting against bottom portions 11a, 11b of the main full bead 11 are formed with an inside full bead 21 and outside full bead 22, which become depressions 21c, 22c. Specifically, the binding or restricting beads 21, 22 which bind or restrict the expansion of the bottom portions 11a, 11b are provided in the parts wherein the bottom portions 11a, 11b of the main full bead 11 abut.

According to the structure, when the metal gasket 1A is pressed, the inside bottom portion 11a of the main full bead 11 fits into the depression 21c of the inside bead 21, and the outside bottom portion 11b fits into the depression 22c of the outside bead 22, so that the main full bead 11 can be prevented from widening, i.e. the width of the main full bead 11 can be prevented from widening in a horizontal direction (direction in the gasket surface). As a result, the stiffness and sealing surface pressure of the main full bead 11 can be remarkably enhanced.

Figure 3:
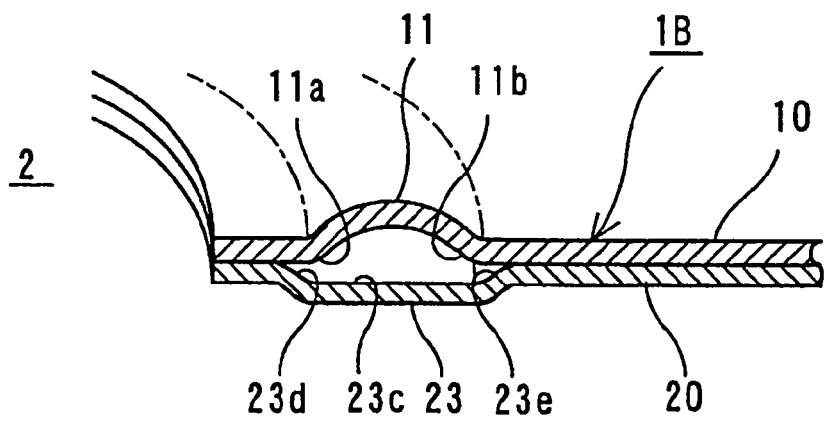
FIG. 3 is a fragmentary perspective view including a cross section showing the cylinder head gasket according to the second embodiment of the present invention.

In the metal gasket 1B according to the second embodiment shown in FIG. 3, in the first metal substrate 10, a main full bead 11 is provided around the cylinder bore 2 which is the sealing hole. Also, in the second metal substrate 20 laminated on the depression side of the main full bead 11, a sub-full bead 23 which is wider than the main full bead 11 is formed in such a way that an inside slope 23d of a depression 23c becomes a part where the inside bottom portion 11a of the main full bead 11 abuts, and an outside slope 23e of the depression 23c becomes a part where the outside bottom portion 11b of the main full bead 11 abuts. Specifically, a binding bead 23 which binds the expansion of the bottom portions 11a, 11b is provided in the parts where the bottom portions 11a, 11b of the main full bead 11 abut. In addition, from a different point of view, the wide full bead 23 can be considered as a combination of two half beads.

According to the structure, when the metal gasket 1B is compressed, the bottom portions 11a, 11b of the main full bead 11 abut respectively against the depression slopes 23d, 23e of the wide sub-full bead 23. Accordingly, the widening of the main full bead 11 can be prevented, and the stiffness and sealing surface pressure of the main full bead 11 can be remarkably enhanced.

Figure 4:
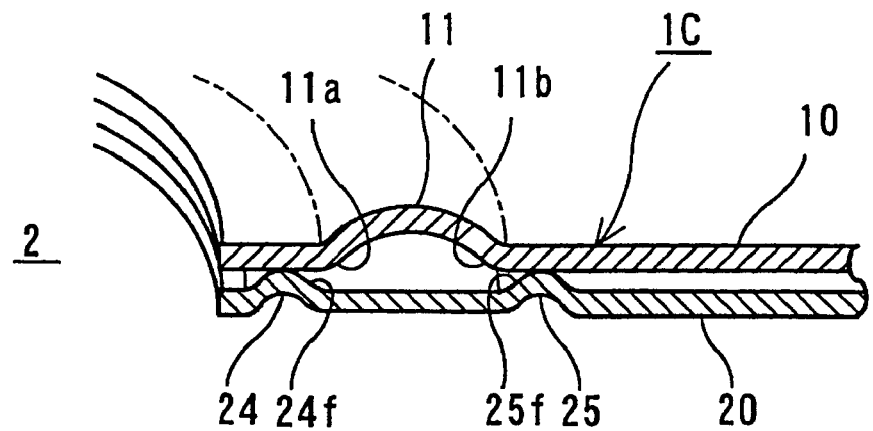
FIG. 4 is a fragmentary perspective view including a cross section showing the cylinder head gasket according to the third embodiment of the present invention.

In the metal gasket 1C according to the third embodiment shown in FIG. 4, in the first metal substrate 10, the main full bead 11 is provided around the cylinder bore 2 which is the sealing hole. Also, in the second metal substrate 20 laminated on the depression side of the main full bead 11, an inside full bead 24 and outside full bead 25 are formed and arranged at an interval wider than the width of the main full bead 11. In the inside full bead 24, a part abutting against the inside bottom portion 11a of the main full bead 11 becomes an outside slope 24f of the projection. In the outside full bead 25, a part abutting against the outside bottom portion 11b of the main full bead 11 becomes an inside slope 25f of the projection. In other words, the binding or restricting beads 24, 25 which bind the expansion of the bottom portions 11a, 11b are provided in the parts where the bottom portions 11a, 11b of the main full bead 11 abut.

According to the structure, when the metal gasket 1C is compressed, the bottom portions 11a, 11b of the main full bead 11 abut against the projection slopes 24f, 25f of the inside full bead 24 and outside full bead 25 respectively. As a result, the widening of the main full bead 11 can be prevented, and the stiffness and sealing surface pressure of the main full bead 11 can be remarkably enhanced.

Figure 5:
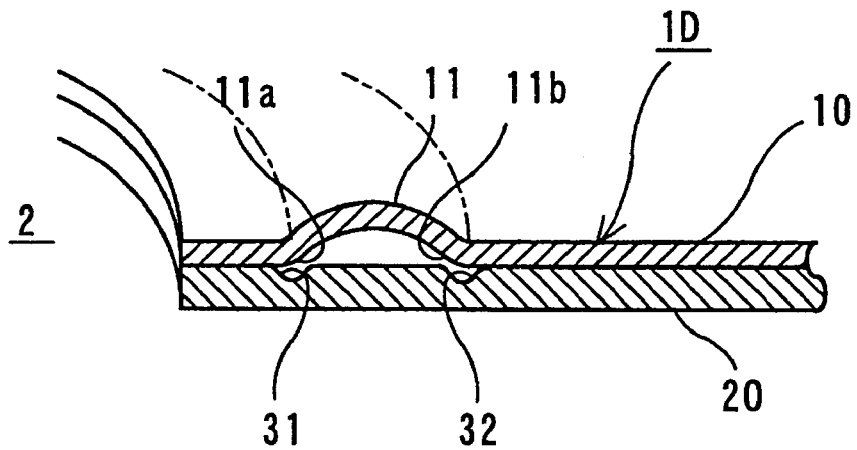
FIG. 5 is a fragmentary perspective view including the cross section showing the cylinder head gasket according to the fourth embodiment of the present invention.

In the metal gasket 1D according to the fourth embodiment shown in FIG. 5, in the second metal substrate 20, instead of using the binding beads 21, 22 of the metal gasket 1A according to the first embodiment, parts abutting against the bottom portions 11a, 11b of the main full bead 11 are formed by an inside depression 31 and an outside depression 32 which are formed by coining. Specifically, instead of using the binding beads 21, 22, the binding depressions 31, 32 formed by the coining are formed. According to the structure, when the metal gasket 1D is pressed, the inside bottom portion 11a of the main full bead 11 fits into the inside depression 31, and the outside bottom portion 11b fits into the outside depression 32. As a result, the widening of the main full bead 11 can be prevented and the stiffness and sealing surface pressure of the main full bead 11 can be remarkably enhanced.

Figure 6:
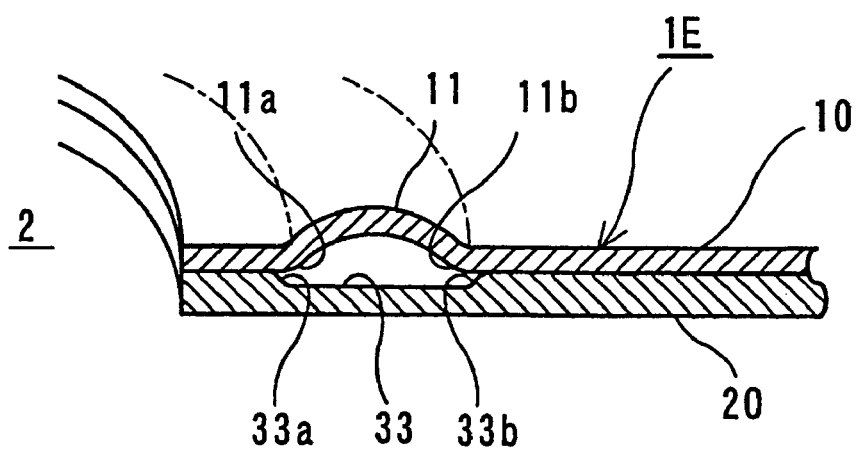
FIG. 6 is a fragmentary perspective view including the cross section showing the cylinder head gasket according to the fifth embodiment of the present invention.

In the metal gasket 1E according to the fifth embodiment shown in FIG. 6, in the second metal substrate 20, instead of using the binding bead 23 of the metal gasket 1B according to the second embodiment, parts abutting against the bottom portions 11a, 11b of the main full bead 11 are formed by a depression 33 made by coining. The depression 33 is formed wider than the main full bead 11, and an inside slope 33a of the depression 33 becomes a part where the inside bottom portion 11a of the main full bead. 11 abuts. Also, an outside slope 33b of the depression 33 becomes a part where the outside bottom portion 11b of the main full bead 11 abuts.

According to the structure, when the metal gasket 1E is compressed, the bottom portions 11a, 11b of the main full bead 11 abut against the slopes 33a, 33b of the wide depression 33 respectively. As a result, the widening of the main full bead 11 can be prevented and the stiffness and sealing surface pressure of the main full bead 11 can be remarkably enhanced.

Also, in any structure of FIGS. 1~6, the binding or restricting beads 21, 22, 23, 24, 25, and the depressions 31, 32, 33 may be provided circularly, or circularly in a discontinuous manner. According to the length and position of the binding bead and the depression, the size (strength) of the binding in a widening direction of the main bead 11 can be finely adjusted.

In addition, the following are examples of the sizes in the metal gasket 1A according to the first embodiment in FIG. 1. In the case that the diameter of the cylinder bore 2 is around 50 mmΦ~90 mmΦ, the first metal substrate 10 and second metal substrate 20 are 0.10 mm~0.40 mm in thickness, respectively. In the main bead 11, the bead is 0.05 mm~0.30 mm in height, and 1.0 mm~5.00 mm in width (distance between the bottom portions). In the inside full bead 21 and outside full bead 22, each bead is 0.01 mm~0.15 mm in height, and 0.5 mm~3.0 mm in width.

According to the cylinder head gaskets 1A~1E of the above-mentioned structure, in the sealing portion around the cylinder bore 2, the expansion in a width direction of the bottom portions 11a, 11b of the main full bead 11 formed in the first metal substrate 10 is bound or restricted, so that the bead stiffness of the main full bead 11 can be improved.

A binding degree in a widening direction of the main full bead 11 can be adjusted by shapes of the binding beads 21~25 or binding depressions 31~33, and the material characteristic or thickness of the second metal substrate. Accordingly, by the combination of the above-mentioned shapes, material characteristic or thickness, and the shape of the main full bead 11, or the material characteristic or thickness of the first metal substrate 10, various surface pressures can be generated.

Therefore, the cylinder head gaskets 1A~1E can finely respond to the required sealing performance relative to each cylinder bore 2. As a result, the cylinder head gaskets 1A~1E can distribute and maintain the appropriate surface pressure around the cylinder bore 2 and so on, and the excellent sealing performance can be obtained.

Figure 7:
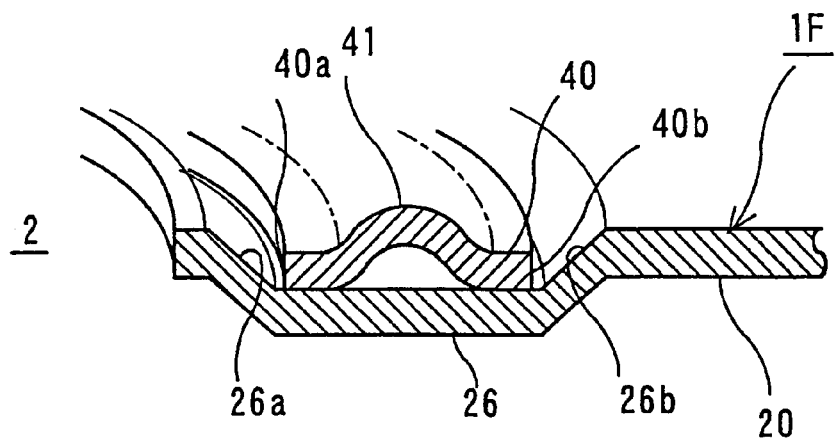
FIG. 7 is a fragmentary perspective view including the cross section showing the cylinder head gasket according to the sixth embodiment of the present invention.
Figure 8:
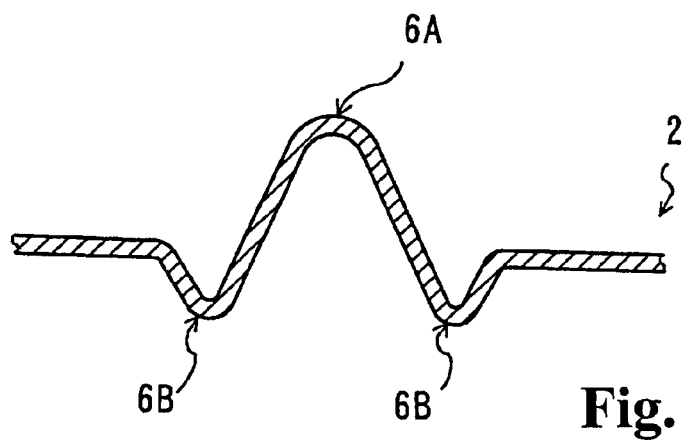
FIG. 8 is a fragmentary perspective view showing a conventional gasket.
Figure 9:
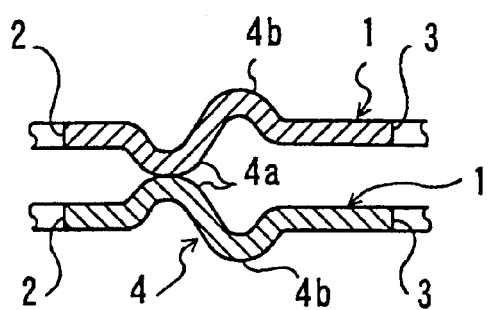
FIG. 9 is a fragmentary perspective view showing a conventional metal gasket.

In the metal gasket 1F according to the sixth embodiment shown in FIG. 7, instead of using the first metal substrate 10 and the main full bead 11, a circular bead plate 40 made from the stainless-annealing material (anneal material) (for example, SUS304) and so on is provided with a main full bead 41.

Also, in the second metal substrate 20 laminated on the depression side of the main full bead 41, a sub-full bead 26 which is wider than the bead plate 40 is formed in such a way that an inside slope 26a of the depression becomes a part where an inside end portion 40a of the bead plate 40 abuts, and an outside slope 26b of the depression becomes a part where an outside end portion 40b of the bead plate 40 abuts. Specifically, the binding bead 26 which binds the expansion of the bottom portions of the main full bead is provided in the parts where the inside and outside end portions 40a, 40b of the bead plate 40 with the main full bead 41 abut. In addition, from a different point of view, the wide full bead 26 can be considered as a combination of two half beads.

According to the above-mentioned structure, when the gasket 1F is compressed, the end portions 40a, 40b of the bead plate 40 abut against the depression slopes 26a, 26b of the wide sub-full bead 26 so that the widening of the main full bead 41 can be prevented, and the stiffness and sealing surface pressure of the main full bead 41 can be remarkably enhanced.

Incidentally, the invention is not limited to the above-mentioned embodiments, and the cylinder head gasket. The invention can be applied to the metal gaskets, such as an induction manifold or exhaust manifold gaskets.

In addition, although the cylinder head gasket constituted by the two metal substrates 10, 20 is explained in the above, the present invention can be applied to a cylinder head gasket constituted by three or more metal substrates. In this case, the two metal substrates constituting the cylinder head gasket include the structure of the above-mentioned metal substrates 10, 20, and another metal substrate is laminated on the metal substrates 10, 20.

The disclosure of Japanese Patent Application No. 2004-331404 filed on Nov. 16, 2004 is incorporated herein.

What is claimed is:

1. A metal gasket comprising:
a first metal plate having a main full bead around a hole to be sealed, said main full bead having bottom portions from which the main full bead directly rises upwardly, and a flat surface around the hole at a side opposite to a side that the main full bead rises; and
a second metal plate laminated with the first metal plate on a depression side of the main full bead, said second metal plate having restricting members for receiving the bottom portions of the main full bead when the gasket is compressed,
wherein said first and second metal plates are made to fit in shapes of engine members to be installed, and
said first metal plate is configured such that the bottom portions are located above the restricting members when the first metal plate is placed on the second metal plate without applying pressure thereto, and the bottom portions project toward the second metal plate and directly engage the restricting members only when the gasket is compressed to restrict lateral expansion of the main full bead to thereby provide an appropriate surface pressure by the main full bead.

2. A metal gasket according to claim 1, wherein said restricting members are depressing portions formed at portions corresponding to the bottom portions of the main full bead, said depressing portions projecting in a direction opposite to the first metal plate from a flat outer surface of the second metal plate so that when the main full bead is compressed, the bottom portions enter the depressing portions and abut against the depressing portions.

3. A metal gasket according to claim 2, wherein each of said depressing portions is a concave portion of a full bead projecting in a direction away from the first metal plate.

4. A metal gasket according to claim 2, wherein said depressing portions are formed of a wide bead projecting in a direction away from the first metal plate, said wide bead having side portions abutting against the bottom portions when the gasket is compressed.

5. A metal gasket according to claim 2, wherein said depressing portions are two concaves formed in the second metal plate without projecting toward a rear surface of the second metal plate.

6. A metal gasket according to claim 2, wherein said depressing portions are formed of a wide depression having side portions abutting against the bottom portions when the gasket is compressed.

7. A metal gasket according to claim 1, wherein said restricting members are formed intermittently around the main full bead.

8. A metal gasket according to claim 1, wherein said first and second metal plates are substantially entirely laminated together.

9. A metal gasket according to claim 1, wherein said first and second metal plates are plain plates laminated together without folding around the hole to be sealed.

10. A metal gasket according to claim 9, wherein said first and second metal plates extend substantially throughout an entire area of the engine members.

11. A metal gasket comprising:
- a first metal plate having an annular ring shape with side edges, and including a main full bead and bottom portions, said main full bead being formed around a hole to be sealed; and
- a second metal plate laminated with the first metal plate on a depression side of the main full bead, said second metal plate having a wide bead in which said first metal plate is disposed, said wide bead having side portions with equal heights as restricting members for restricting expansion of the main full bead so that when the gasket is compressed, lateral expansion of the main full bead is restricted equally by the side portions to provide an appropriate surface pressure by the main full bead,
- wherein said first metal plate is disposed in the wide bead such that the main full bead projects in a direction opposite to a direction that the wide bead projects, and has a lateral size such that the first metal plate is entirely disposed in the wide bead, and when the gasket is compressed, the full bead is compressed and the side edges of the first metal plate abut against the side portions of the wide bead.

12. A metal gasket according to claim 11, wherein the bottom portions of the main full bead including edges thereof contact a flat portion between the side portions of the wide bead when the first and second metal plates are assembled without compression.

* * * * *